US006050453A

United States Patent [19]

Kelders et al.

[11] Patent Number: 6,050,453

[45] Date of Patent: Apr. 18, 2000

[54] ACTUATOR GRIP AND APPARATUS PROVIDED THEREWITH

[75] Inventors: Johannes Hubertus Josef Maria Kelders, Drunen, Netherlands; Tilwin Lepsius, Dusseldorf, Germany; Willem Klaassen, Drunen, Netherlands

[73] Assignee: Henkel Kommanditgesellschaft auf Aktien, Dusseldorf, Germany

[21] Appl. No.: 09/051,558

[22] PCT Filed: Oct. 11, 1996

[86] PCT No.: PCT/NL96/00396

§ 371 Date: Jul. 16, 1998

§ 102(e) Date: Jul. 16, 1998

[87] PCT Pub. No.: WO97/13587

PCT Pub. Date: Apr. 17, 1997

[30] Foreign Application Priority Data

Oct. 11, 1995 [NL] Netherlands ........................... 1001401

[51] Int. Cl.[7] .............................. B67D 5/32; G01F 11/00

[52] U.S. Cl. ...................... 222/153.13; 222/323; 222/391

[58] Field of Search .................................... 222/323, 324, 222/391, 153.01, 153.04, 153.11, 153.13

[56] References Cited

U.S. PATENT DOCUMENTS 1,718,596 6/1929 Smith ...................................... 222/391
4,167,245 9/1979 Kock et al. ............................ 222/391
4,485,944 12/1984 Eichholz ................................ 222/390
4,744,494 5/1988 Seager et al. ........................... 222/391
4,840,294 6/1989 Ernst ...................................... 222/287
4,951,846 8/1990 Oster etal. .............................. 222/391

FOREIGN PATENT DOCUMENTS 0328382 8/1989 European Pat. Off. .
2568857 2/1986 France .
8602553 4/1986 Germany .
2172059 9/1986 United Kingdom .

*Primary Examiner*—Kevin Shaver
*Assistant Examiner*—Keats Quinalty
*Attorney, Agent, or Firm*—Webb Ziesenheim Logsdon Orkin & Hanson, P.C.

[57] ABSTRACT

The invention relates to an actuator grip provided with a fixed grip part and a trigger part which is pivotally connected thereto and which is drivingly connected to a movable member of an apparatus for actuating by the hand-grip. The pivot connection between the grip part and the trigger part is arranged on the side of the hand-grip remote from the member for actuating. An ergonomically sound and well controllable movement of the trigger part relative to the grip part is hereby obtained, whereby the apparatus connected to the hand-grip can be actuated accurately and with relatively little effort. The invention further relates to a caulking gun which is provided with a container for a medium for dispensing having an outlet aperture and a movable member for urging the medium for dispensing from the container through the outlet aperture, and an actuator grip as described above connected to the container and the movable member.

13 Claims, 7 Drawing Sheets

ACTUATOR GRIP AND APPARATUS PROVIDED THEREWITH

BACKGROUND OF THE INVENTION

The invention relates to an actuator grip provided with a fixed grip part and a trigger part which is pivotally connected thereto and which is drivingly connected to a movable member of an apparatus for actuating by the grip. Such an actuator grip is generally known and is for instance frequently applied in caulking guns for adhesive or filler cartridges.

DESCRIPTION OF THE PRIOR ART

The known actuator grip is usually fixed to a housing in which can be received a cartridge with for instance adhesive or filler, such as mastic. The housing and the actuator grip thus form a gun. Further generally accommodated in the housing is a piston which engages on a movable bottom of the cartridge and is movable under the influence of the actuator grip. The bottom of the cartridge is thus pushed inward and the medium present in the cartridge is forced therefrom as a result. The known actuator grip has a grip part which is fixedly connected co the housing and a trigger part pivotally connected to the grip part. The pivot connection is herein generally situated practically at the position of the connection of the grip part to the housing.

When the grip is grasped by a user, the index finger of the user rests on the trigger part in the vicinity of the pivot point, while the little finger of the user is situated at the position of the free end of the trigger part. When the user therefore wishes to operate the caulking gun by squeezing the grip whereby the trigger part is pivoted toward the fixed grip part, he must make a relatively large movement with his little finger, while his index finger can remain more or less in place. This is undesirable from an ergonomic viewpoint since the index finger will generally be considerably more mobile and better controllable than the little finger.

SUMMARY OF THE INVENTION

The invention therefore has for its object to provide an actuator grip of the above described type which enables a more natural and better controllable movement of the trigger part. According to the invention this is achieved in that the pivot connection between the grip part and the trigger part is arranged on the side of the grip remote from the member for actuating. The pivot point of the trigger part is thus situated at the position of the little finger of the user, while the free end of the trigger part, which makes the largest stroke, is situated at the position of the index finger. In this manner an ergonomically sound and well controllable movement of the trigger part relative to the grip part is obtained, whereby the apparatus connected to the grip can be actuated accurately and with relatively little effort.

The invention also relates to an apparatus, in particular a caulking gun, which is provided with an actuator grip as described above.

BRIEF DESCRIPTION OF THE DRAWINGS

The invention will now be elucidated on the basis of two embodiments wherein reference is made to the annexed drawing, in which.

DETAILED DESCRIPTION OF THE PREFERRED EMBODIMENTS

Figure 1:
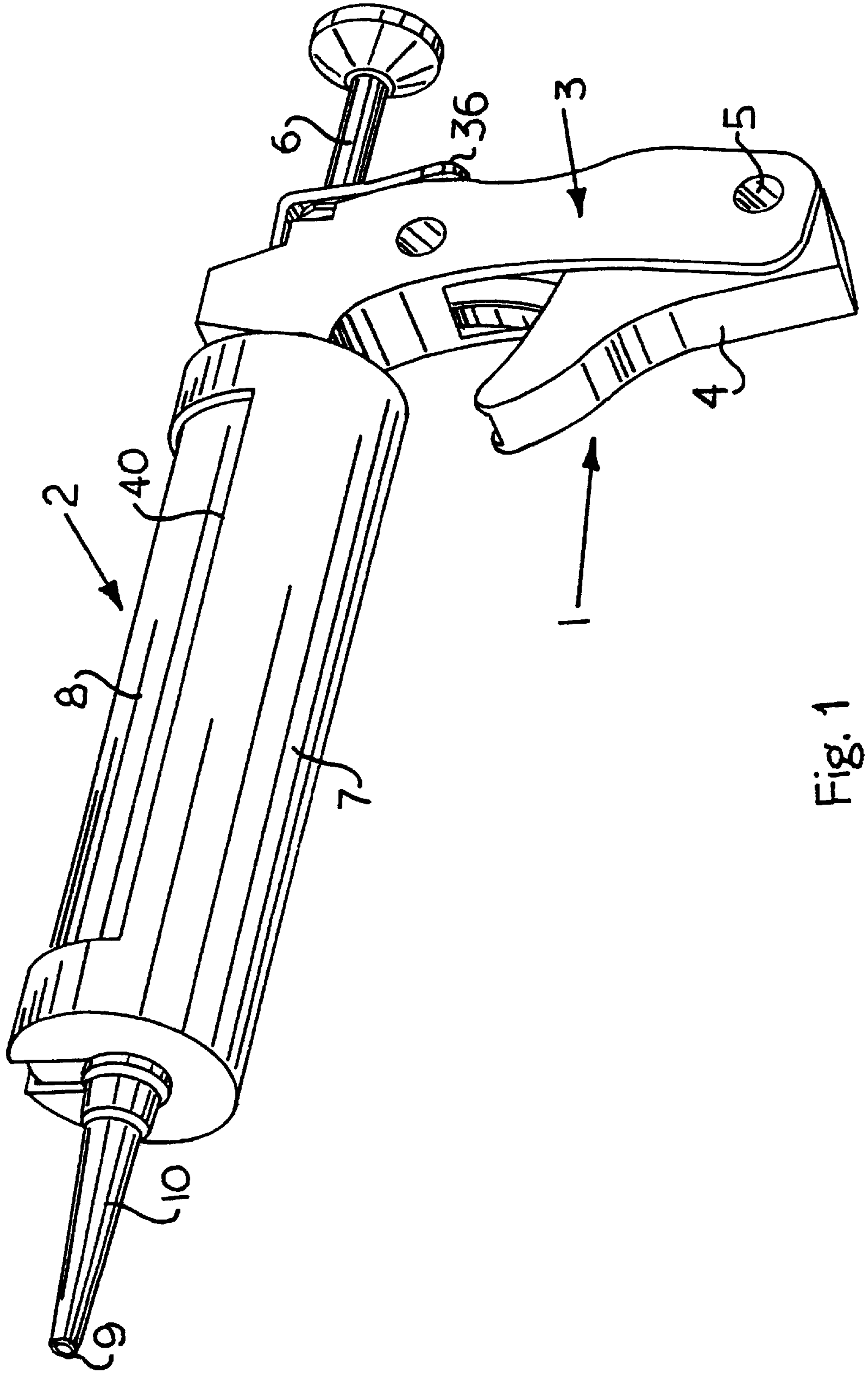
FIG. 1 shows a perspective view of a first: embodiment of a caulking gun with an actuator grip according to the invention.
Figure 4:
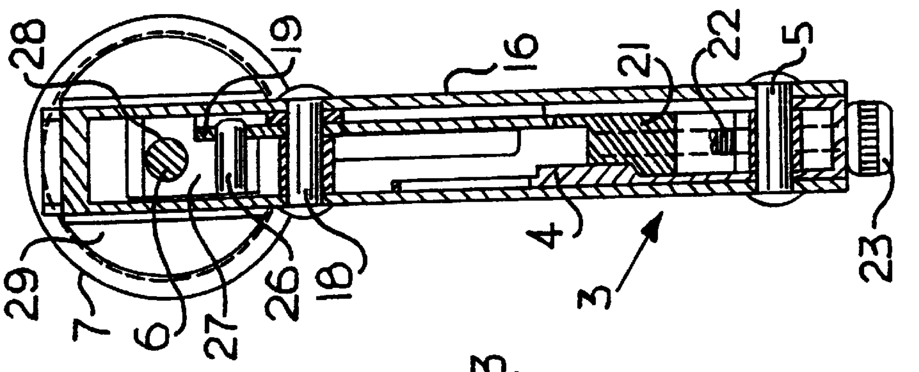
FIG. 4 shows a longitudinal section of the grip taken along the line IV—IV in FIG. 2.
Figure 2:
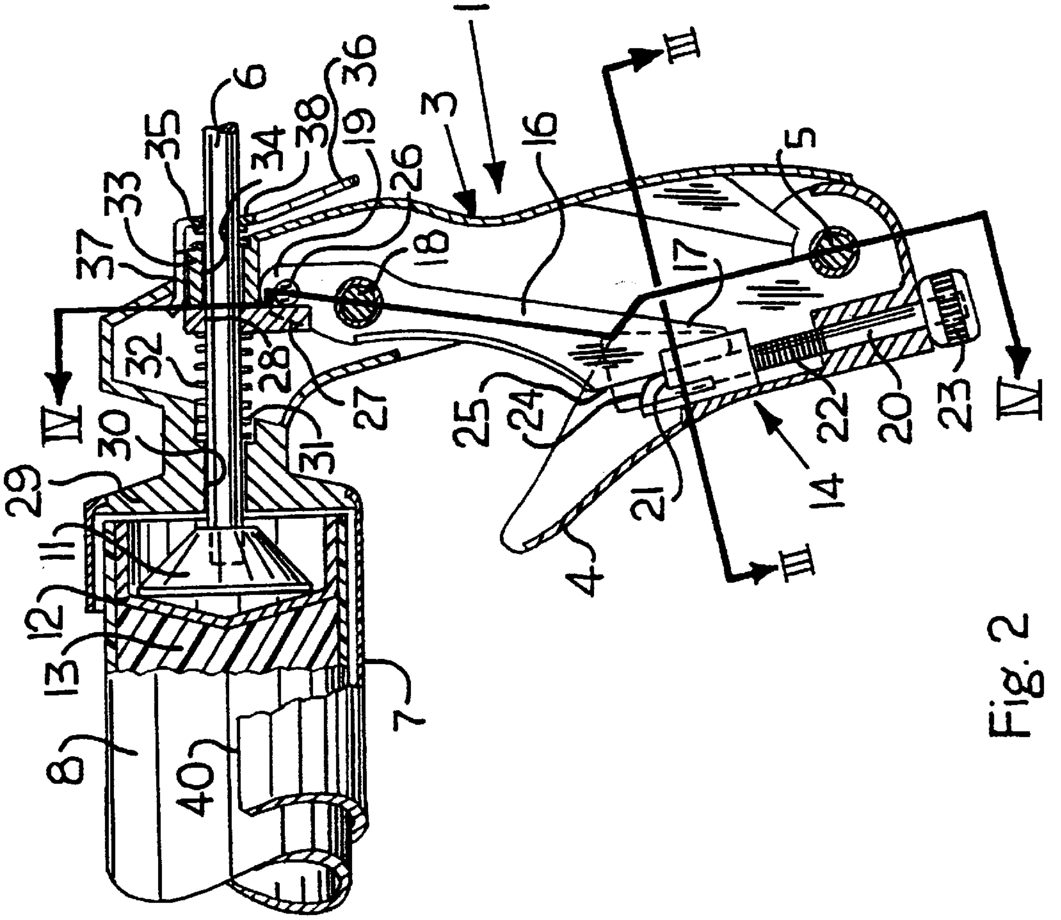
FIG. 2 shows a partly sectional perspective side view of the actuator grip and a part of the gun of FIG. 1.

An actuator grip 1 for a caulking gun 2 (FIG. 1) has a grip part 3 which is fixedly connected to the rest of gun 2 and a trigger part 4 which is pivotally connected to the grip part 3. The trigger part 4 is drivingly connected to a movable member, here the piston rod 6 of gun 2. The piston rod 6 is received slidably in gun 2 and is provided on its front side with a piston 11 (FIG. 2), which co-acts with a displaceable bottom 12 of a cartridge 8. The cartridge 8, which can be filled with an adhesive or a filler 13, is received in a housing 7 of gun 2 which is circle segment-like in cross section and has a nozzle 10 with outlet aperture 9 through which the content 13 of cartridge 8 is pressed out when the piston rod 6 with piston is moved forward by actuating the trigger part 4. The pivot point 5 is situated as shown on the side of the grip 1 remote from the piston rod for actuating, while trigger part 4 extends from the pivot connection 5 in the direction of the housing 7 of gun 2. Thus is achieved that when a user grasps the grip 1, his index finger engages on the part of the trigger 4 which makes the largest stroke and his little finger is located at the practically immobile part of the trigger in the vicinity of pivot point 5. The trigger can hereby be operated in ergonomically sound and well controlled manner.

Figure 3:
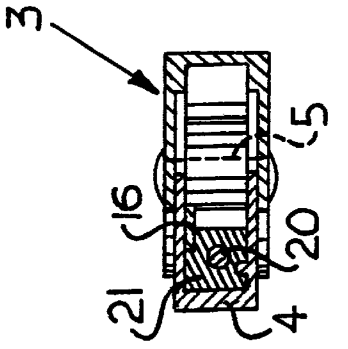
FIG. 3 shows a cross section through the grip along the line III—III in FIG. 2.

Between trigger part 4 and piston rod 6 for actuating thereby is arranged an adjustable transmission 14 whereby the ratio between the pivot movement of trigger part 4 and the displacement of piston rod 6 resulting therefrom can be varied. Further arranged between trigger part 4 and piston rod 6 are also means 15 for reversing the movement of piston rod 6. These movement reversing means 15 are formed by a lever 16 which is pivotally connected to the fixed grip part 3 via a pivot shaft 18. The one outer end 17 of lever 16 co-acts with trigger part 4, while the other outer end 19 is co-acts with piston rod 6. The transmission 14 is formed by an arm 20 which is connected to trigger part 4 and on which is arranged a pressing element 21 which is in engagement with the outer end 17 of lever 16 and thus via this lever with piston rod 6. The pressing element 21 is displaceable along the arm 20 relative to pivot point 5, whereby with a determined pivoting movement of trigger part 4 the stroke of pressing element 21 can be varied and therewith also the resulting displacement of piston rod 6. For this purpose the pressing element 21 is formed as a nut which is accommodated in non-rotatable but slidable manner in trigger part 4, which has a substantially U-shaped cross section (FIG. 3). The arm 20 is further provided with a screw thread part 22 along which the nut can be displaced by the arm 20 by means of turning a knob 23 arranged on its outer end and extending outside trigger part 4. The pressing element 21 otherwise has a slightly rounded contact surface 24 which co-acts with a contact surface 25 of the lever 16. Due to the curvature of contact surface 24 the contact point of the co-acting surfaces 24,25 displaces during the movement of the trigger part 4. The ratio between the lever arm of trigger part 4—the distance between the contact point and the pivot point 5—and that of the movement reversing means 15—the distance between the contact point and the pivot shaft 18—hereby changes. This has the result that the squeezing force required for depressing the trigger part 4 is relatively slight initially but increases during the movement. This is favourable since at the beginning of the movement the fingers of the user are stretched and can produce relatively little force, while with further pressing together of the fingers the available force continues to increase.

Arranged on the top part 19 of lever 16 is a pressing element 26 which is in engagement with a thrust plate 27. This plate 27 is provided with a bore 28 through which is placed the piston rod 6. As stated, piston rod 6 is mounted slidably in gun 2. For this purpose the grip 1 is provided at its top with a bearing block 33 with a bore 34 and with an end part 29 with a bore 30. The end part 29 is in turn connected to the housing 7 in which the cartridge 8 is received. The bore 30 is provided with a widened end part 31, in which is received a biasing spring 32 which is arranged round piston rod 6 or is in engagement with thrust plate 7. This biasing spring 32 is a pressure spring holding the different parts of actuator grip 1 in the shown position when the gun 2 is not in use. On the rear side of bearing block 33 is arranged a pressure spring 35 with which a locking lever 36, which is arranged pivotally in an opening 37 in grip part 3 and which is provided with an aperture 38 through which the piston rod 6 protrudes, is held in a slightly pivoted position, whereby piston rod 6 is clamped in the aperture 38 of locking lever 36. By now moving the locking lever 36 counter to the force of pressure spring 35 toward the grip part 3, the clamping action of locking lever 36 on piston rod 6 is eliminated whereby piston rod 6 can be moved rearward, for instance to change a cartridge 8.

Figure 6:
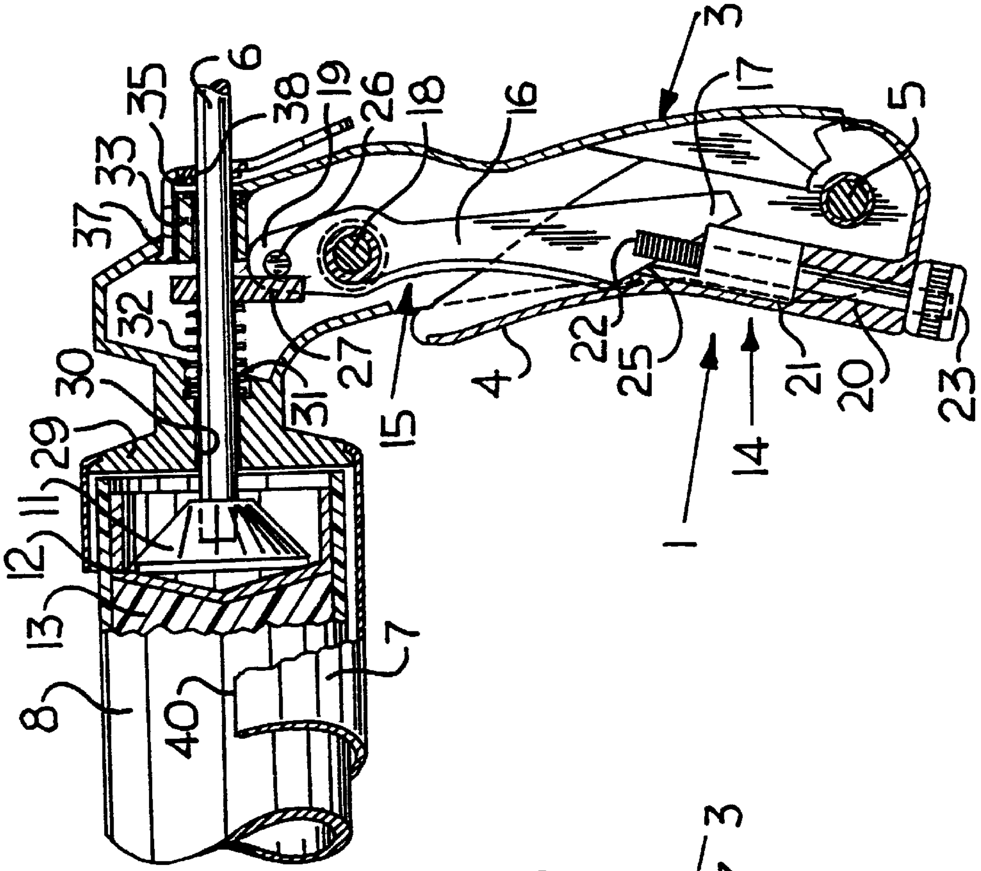
FIG. 6 is a view corresponding with FIG. 5 of the grip in a second squeezed situation.
Figure 5:
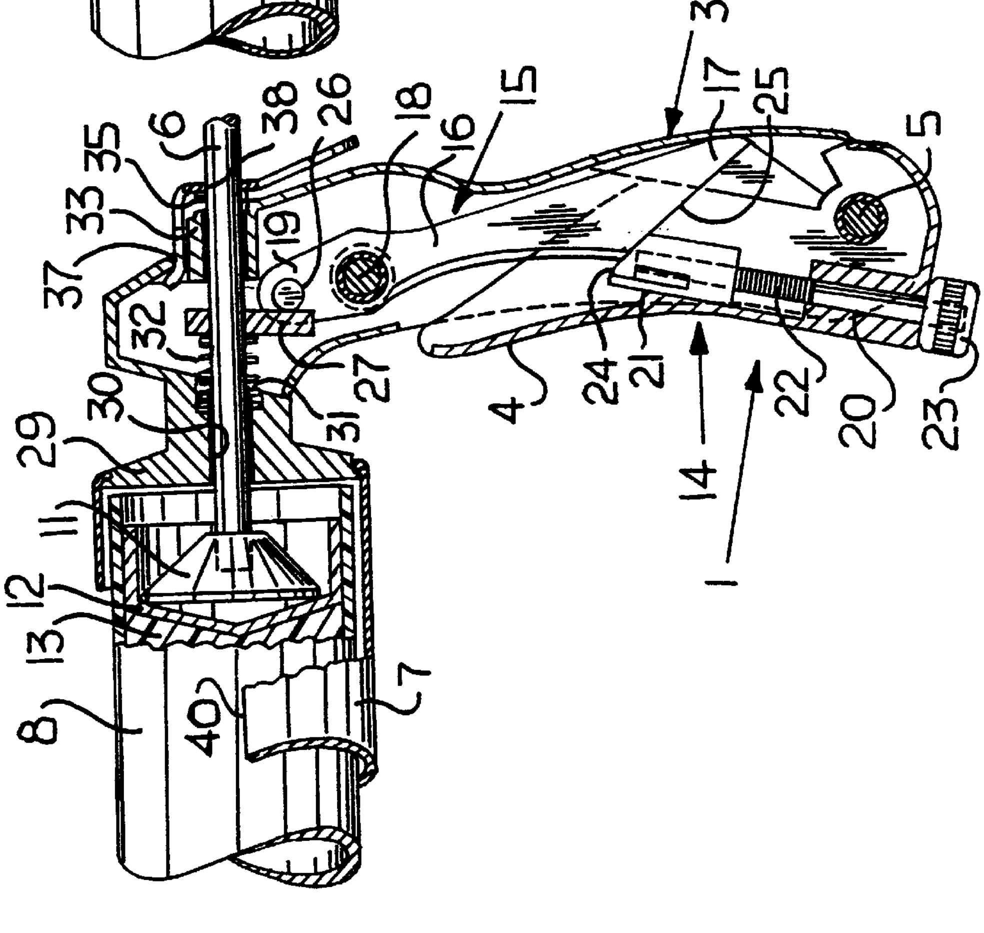
FIG. 5 is a view corresponding with FIG. 2 of the grip in a first squeezed situation.

If the gun 2 is now used, the grip 1 is squeezed inward, whereby trigger part 4 is pivoted to the fixed grip part 3 (FIG. 5). The rearward movement of trigger part 4 is converted by the reversing mechanism 15 into a forward movement of the thrust place 27. The bore 28 in thrust plate 27 is chosen such that thrust plate 27 will tilt slightly under the influence of the opposing forces being exerted thereon by the pressing element 26 of the lever 16 on one side and the biasing spring 32 on the other, whereby it will clamp fixedly onto the piston rod 6. Piston rod 6 is hereby carried along by thrust plate 27, whereby the displaceable bottom 12 in cartridge 8 is thus displaced over a determined stroke length. As stated, this stroke length is determined by the position of the pressing element 21 of transmission mechanism 14. If this pressing element 21 is displaced the stroke of lever 16 and therewith of thrust plate 27 is changed. This can be seen when FIGS. 5 and 6 are compared with each other. When the trigger 4 is subsequently released, the thrust plate 27 is moved rearward again under the influence of the spring force of spring 32, carrying therewith the lever 16. Because the forces occurring therein are markedly smaller than during depressing of trigger 4, the tendency of thrust place 27 to tilt is practically non-existent, whereby it slides back over the piston rod 6. The piston rod 6 herein remains in its somewhat extended position due to the engagement with the locking lever 36. By repeatedly actuating the trigger 4 the piston 11 can thus be moved forward in stepwise manner in cartridge 8, whereby the filling 13 is thus pressed out of cartridge 8. Once cartridge 8 has been completely emptied, the piston rod 6 can be pushed back to the retracted position by depressing the locking lever 36.

Figure 7:
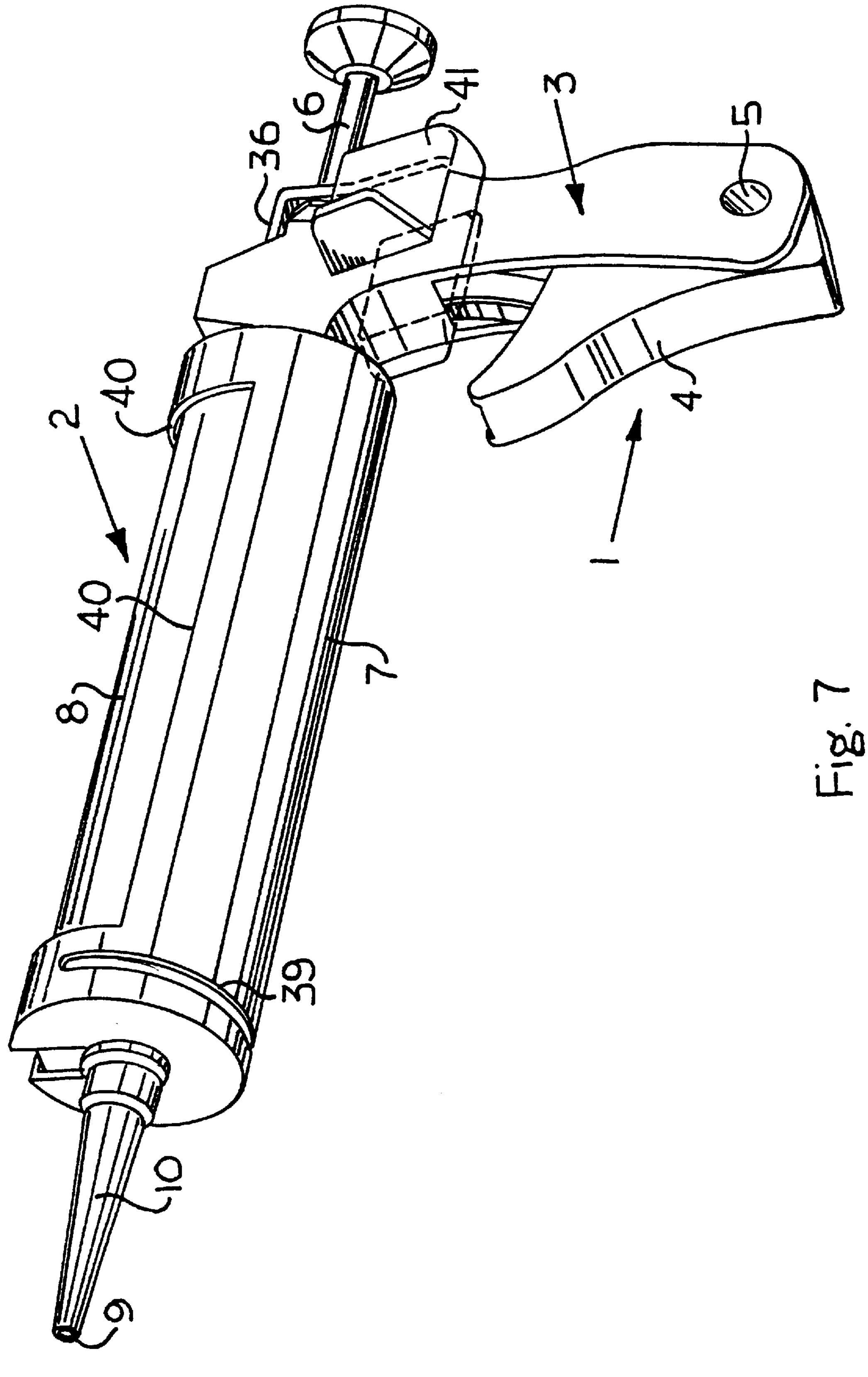
FIG. 7 is a view corresponding with FIG. 1 of a second embodiment of the caulking gun with the actuator grip according to the invention.
Figure 8:
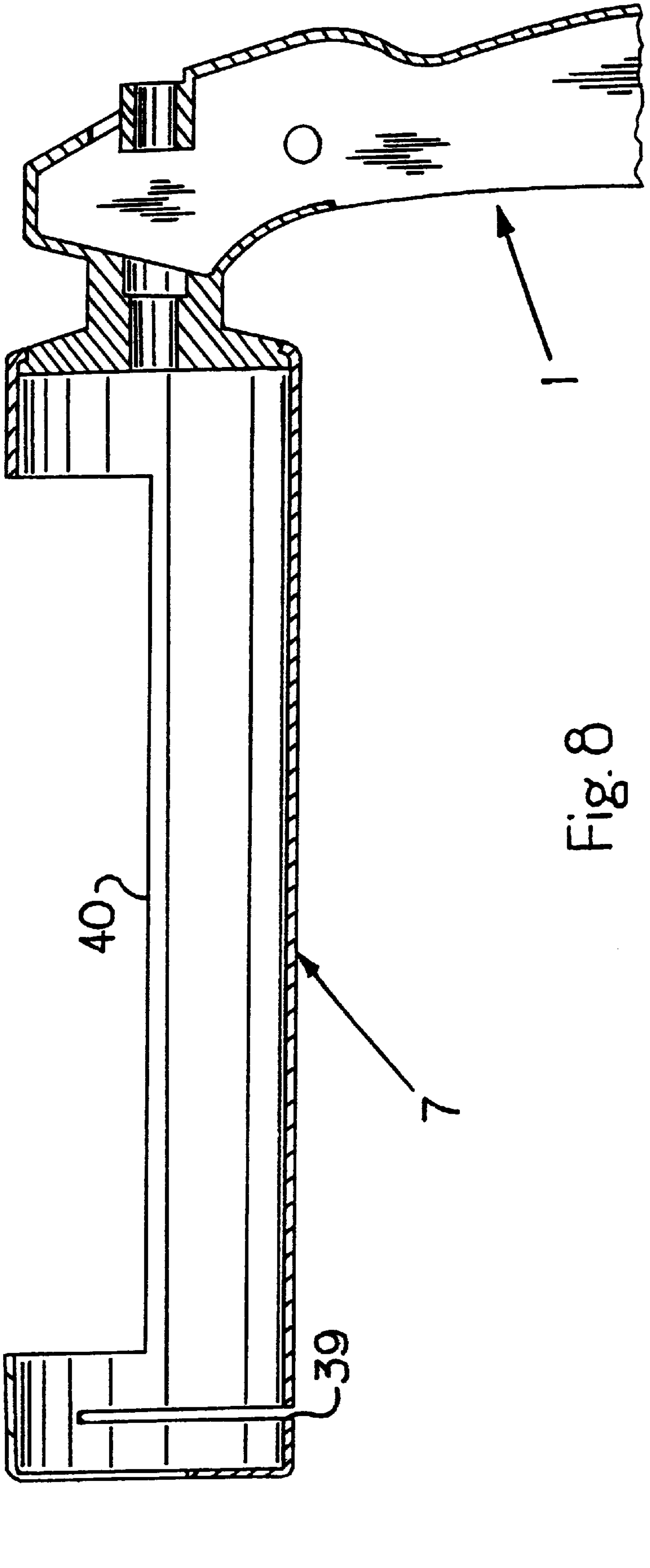
FIG. 8 is a sectional side view of the grip part of the actuator grip and the housing of the gun of FIG. 7.

In the alternative embodiment of the gun (FIG. 7) the housing 7, which takes the form of a cylinder with a relatively large recess 40 on the upper part of its side wall, is provided on the side remote from the actuator grip 1 with an incision or stabilizing slot 39 which extends radially over the lower half of housing 7 (FIG. 8). This incision 39 has the object of preventing deformation of the cartridge 8 as a result of the uneven support thereof by housing 7, which is indeed cut away over a large part of its upper side. As a result of the incision 39, which lies in radial direction opposite the large recess 40 in housing 7, the housing 7 is deformed uniformly and the cartridge 8 is uniformly loaded, whereby the deformation thereof will also be uniform.

Figure 9A:
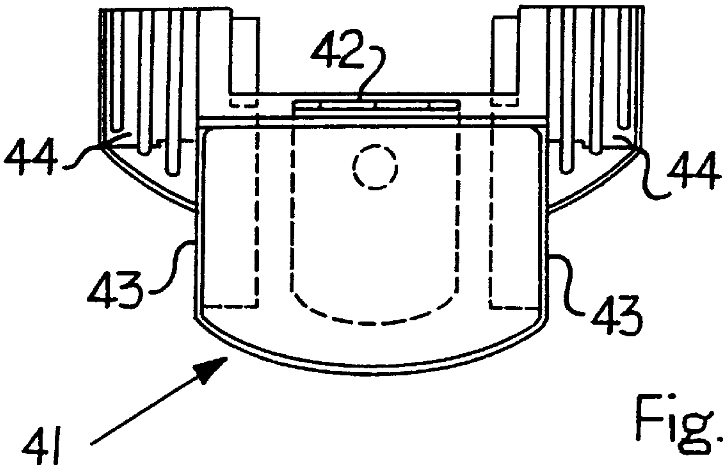
FIGS. 9A, 9B and 9C show respectively a rear view, side view and top view of a locking lever as applied in the gun of FIG. 7.
Figure 9B:
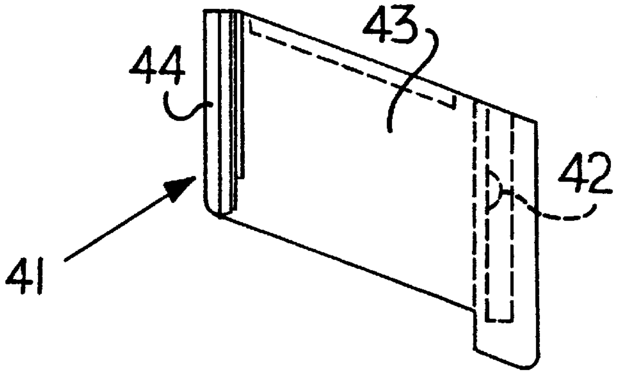
Figure 9C:
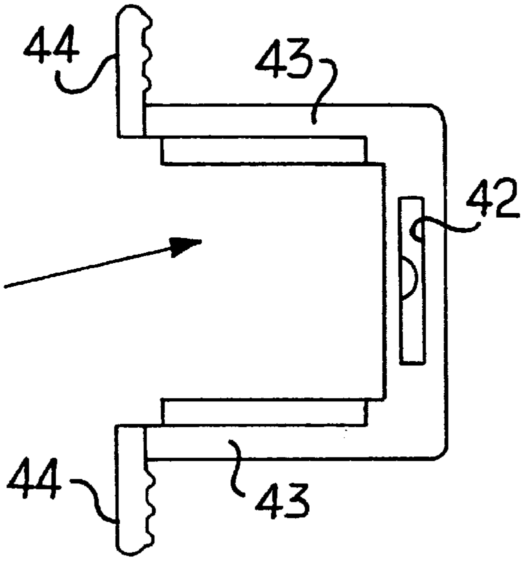
Figure 12:
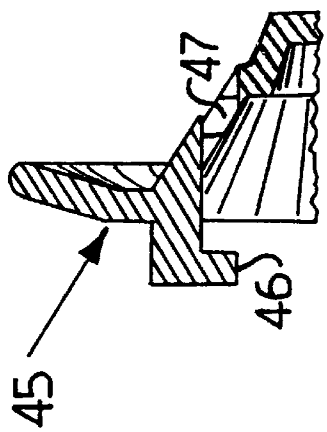
FIGS. 11 and 12 show respectively cross sections along the lines XI—XI and XII—XII in FIG. 10A.
Figure 10B:
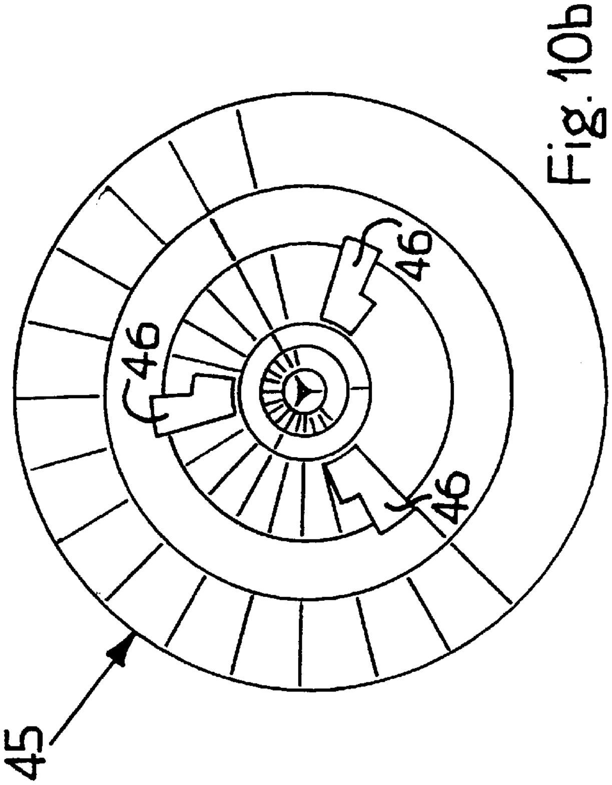
FIGS. 10A and 10B show respectively a top view and a bottom view of a piston accessory for use in the gun of FIG. 7.
Figure 11:
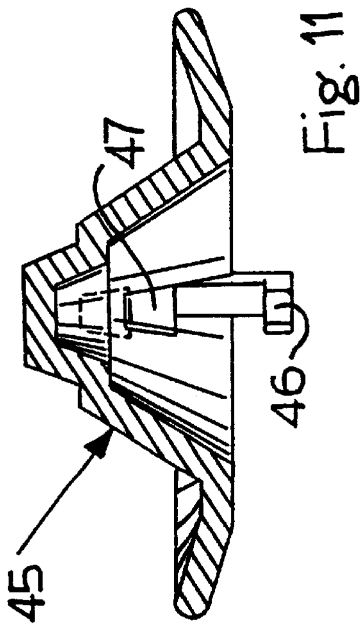
Figure 10A:
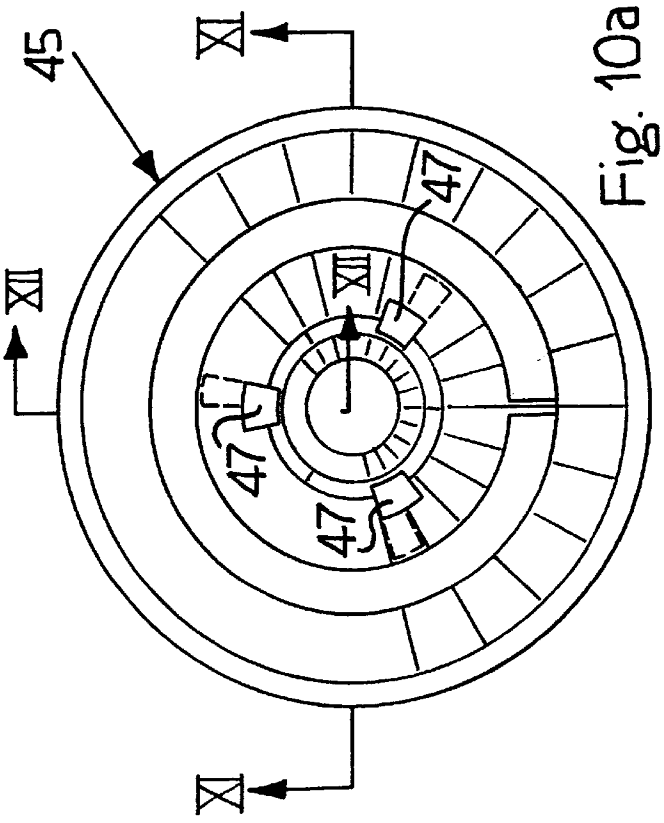

In this embodiment the locking lever 36 is also slightly adapted by arranging thereon a substantially U-shaped extension piece 41 (FIGS. 9A–C). The extension piece 41, which is provided at its top with a receiving space 42 for locking lever 36, engages with two flanges 43 round both sides of actuator grip 1. The flanges 43 end in outward protruding wings 44, whereby the locking lever 36 can be operated simply using the thumb. The shown embodiment with two flanges 43 and two protruding parts 44 ensures that locking lever 36 can be operated simply with both the left and the right hand. However, it is of course also possible to use a single-action extension piece, which would not be embodied in U-shaped cross section but rather L- or S-shaped and which would only have a single side flange 43 and wing 44. Separate left and right-handed embodiments would then be necessary here.

In order to make the gun 2 also suitable for use with cartridges 8 not provided with their own piston 12, such as for instance "full shell" cartridges which consist of a tube with a "sausage" arranged therein which is filled with a substance 13 for applying such as adhesive or filler, a separate coupling piece 45 can be applied (FIGS. 10A, 10B, 11, 12). The coupling piece 45 is dish-shaped and provided with three snap-fitting arms 46 which protrude at regular intervals on the underside of coupling piece 45 and grip round the piston 11. At the position of the snap-fitting arms 46 the coupling piece 45 is further provided with apertures 47, thus ensuring the elasticity at that position. The snap-fitting arms are also accessible through these apertures 47, so that they can for instance be pressed apart to release coupling piece 45 from piston 11.

Although the stabilizer slot 39, the extension piece 41 and the coupling piece 45 are described above in combination with a gun with an actuator grip having a trigger 4 which hinges at the bottom, it will be apparent to the skilled person that these structural elements can also be applied advantageously in other guns, which can for instance be provided with a conventional actuator grip having a trigger which hinges at the top.

Although the actuator grip according to the invention is described above in relation to a caulking gun for cartridges it will be further apparent that it can find many other applications. A spray nozzle for a hose or similar apparatus can for instance be envisaged here.

We claim:

1. An actuator grip comprising a fixed grip part and a trigger part which is pivotally connected thereto and which is drivingly connected to a movable member of an apparatus for actuating by the actuator grip, and a locking member which co-acts with the movable member and extends along at least one side of the actuator grip, wherein the pivot connection between the grip part and the trigger part is arranged on the side of the actuator grip remote from the member for actuating.

2. The actuator grip as claimed in claim 1, wherein the grip part is configured to be grasped with the hand, the pivot connection is situated on the little finger side of the grip and the trigger part extends from the pivot connection to the index finger side of the grip.

3. The actuator grip as claimed in claims 1, wherein an adjustable transmission is arranged between the trigger part and the member for actuating in order to vary the ratio between a pivoting movement of the trigger part and a movement of the member driven thereby.

4. The actuator grip as claimed in claim 3, wherein the transmission includes an arm which is connected to the trigger part and on which a pressing element in engagement with the member for actuating is arranged displaceably relative to the pivot connection.

5. The actuator grip as claimed in claim 4, wherein the arm is provided with a screw thread and the pressing element is a nut displaceable therealong.

6. The actuator grip as claimed in claim 1, further including means arranged between the trigger part and the member for actuating for the purpose of reversing the movement of the member.

7. The actuator grip as claimed in claim 6, wherein the movement reversing means includes a lever which is pivotally connected to the grip part and of which one outer end co-acts with the trigger part and an other outer end co-acts with the member for actuating.

8. An apparatus comprising a container for a medium for dispensing and having an outlet aperture and a movable member for urging the medium for dispensing from the container through the outlet aperture and an actuator grip as claimed in claim 1 connected to the container and the movable member.

9. The apparatus as claimed in claim 8, further including a housing for receiving the container which is circle segment-like in cross section and is connected to the actuator grip, which housing has at least one stabilizing incision running in peripheral direction.

10. The apparatus as claimed in claim 9, wherein the housing takes the form of a cylinder with a partly cut away side wall and the stabilizing incision is located in radial direction substantially opposite the cut away wall part.

11. The apparatus as claimed in claim 8, wherein the locking member has a substantially U-shaped part extending round the actuator grip.

12. The apparatus as claimed in claim 8, wherein the movable member has a releasable coupling part for adapting to the container.

13. The apparatus as claimed in claim 12, wherein the coupling part is substantially dish-shaped and has a plurality of protruding snap-fitting elements.

* * * * *

UNITED STATES PATENT AND TRADEMARK OFFICE

CERTIFICATE OF CORRECTION

PATENT NO. : 6,050,453
DATED : April 18, 2000
INVENTOR(S) : Johannes H.J.M. Kelders et al.

It is certified that error appears in the above-identified patent and that said Letters Patent is hereby corrected as shown below:

Column 1 after Line 4 insert --1. Field of the Invention--.

Column 1 Line 13 "DESCRIPTION OF THE PRIOR ART" should read --2. Description of the Prior Art--.

Column 1 Line 23 "connected co" should read --connected to--.

Column 2 Line 60 after "19" delete "is"--.

Column 3 Line 52 "thrust place 27" should read --thrust plate 27--.

Column 4 Line 3 "place 27" should read --plate 27--.

Column 5 Line 17, Claim 3, "in claims 1" should read --in claim 1--.

Signed and Sealed this

Twenty-fourth Day of April, 2001

*Attest:*

NICHOLAS P. GODICI

*Attesting Officer*

*Acting Director of the United States Patent and Trademark Office*